United States Patent
Le Costaquec

(10) Patent No.: US 10,260,174 B2
(45) Date of Patent: Apr. 16, 2019

(54) SYSTEMS AND METHODS FOR CONTROLLING CARBON TOW WIDTH

(71) Applicant: GOODRICH CORPORATION, Charlotte, NC (US)

(72) Inventor: Jean-Francois Le Costaquec, Pueblo West, CO (US)

(73) Assignee: Goodrich Corporation, Charlotte, NC (US)

( * ) Notice: Subject to any disclaimer, the term of this patent is extended or adjusted under 35 U.S.C. 154(b) by 1053 days.

(21) Appl. No.: 14/075,819

(22) Filed: Nov. 8, 2013

(65) Prior Publication Data

US 2015/0132573 A1    May 14, 2015

(51) Int. Cl.

| | | |
|---|---|---|
| *D01G 13/00* | (2006.01) | |
| *D04H 3/002* | (2012.01) | |
| *D02J 1/18* | (2006.01) | |
| *F16D 69/02* | (2006.01) | |
| *D01F 9/12* | (2006.01) | |
| *D02G 3/40* | (2006.01) | |

(52) U.S. Cl.
CPC ............... *D01G 13/00* (2013.01); *D01F 9/12* (2013.01); *D02G 3/402* (2013.01); *D02J 1/18* (2013.01); *D04H 3/002* (2013.01); *F16D 69/023* (2013.01); *D10B 2101/12* (2013.01); *Y10T 428/2918* (2015.01)

(58) Field of Classification Search
CPC .......... D01G 13/00; D01F 9/12; D02G 3/402; D02J 1/18; D04H 3/002; F16D 69/023; Y10T 428/2918; D10B 2101/12
See application file for complete search history.

(56) References Cited

U.S. PATENT DOCUMENTS

| | | | | |
|---|---|---|---|---|
| 3,327,708 | A * | 6/1967 | Sokolowski | ...... A61F 13/15642 156/290 |
| 4,238,257 | A * | 12/1980 | Remi | ...... B32B 18/00 156/155 |
| 6,143,818 | A * | 11/2000 | Wang | ...... C08K 5/01 524/474 |
| 6,503,856 | B1 * | 1/2003 | Broadway | ...... B29B 15/122 442/268 |
| 2009/0169836 | A1 * | 7/2009 | Thomas | ...... B32B 5/26 428/196 |
| 2010/0227167 | A1 * | 9/2010 | Tsai | ...... D02G 3/34 428/375 |
| 2012/0114899 | A1 * | 5/2012 | Ellis | ...... B29C 70/386 428/114 |

FOREIGN PATENT DOCUMENTS

| | | | | |
|---|---|---|---|---|
| CN | 102581903 | A | * | 7/2012 |
| GB | 1392139 | | | 4/1975 |
| JP | 10266066 | A | * | 10/1998 |

OTHER PUBLICATIONS

Extended European Search Report dated Mar. 18, 2015 in European Application No. 14191539.7.
EP Communication under Rule 71(3) EPC dated Oct. 24, 2017 in European Application No. 14191539.7.
EP Office Action dated Feb. 8, 2017 in EP Application No. 15157796.2.

* cited by examiner

*Primary Examiner* — James Mellott
(74) *Attorney, Agent, or Firm* — Snell & Wilmer, L.L.P.

(57) ABSTRACT

A technique allowing a portion of carbon fiber tow to maintain a rectangular cross sectional shape or to maintain an imparted desired shape, such as a wider shape with a rectangular cross-sectional profile, through a textile loom is disclosed herein.

9 Claims, 6 Drawing Sheets

SYSTEMS AND METHODS FOR CONTROLLING CARBON TOW WIDTH

FIELD

This disclosure generally relates to textile preparation, and more particularly, to systems and methods associated with carbon fiber tow shaping.

BACKGROUND

Carbon/carbon ("C/C") parts are employed in various industries. An exemplary use for C/C parts includes using the parts as friction disks such as aircraft brake disks, race car brake disks, clutch disks, and the like. C/C brake disks are especially useful in such applications because of the superior high temperature characteristics of C/C material. In particular, the C/C material used in C/C parts is a good conductor of heat, and thus, is able to dissipate heat away from the braking surfaces that is generated in response to braking. C/C material is also highly resistant to heat damage, and is capable of sustaining friction between brake surfaces during severe braking, without a significant reduction in the friction coefficient or mechanical failure. The fabrication of C/C parts involves attention to detail at each step of the process.

SUMMARY

A technique configured to maintain a rectangular cross sectional shape or to maintain an imparted desired shape is disclosed herein, such as a wide shape with a rectangular cross-sectional profile of a carbon fiber tow through a textile loom. A portion of a carbon fiber tow (such as a span of carbon fiber tow/ribbon) may be treated with a binding agent (such as a soft binder). The portion of a carbon fiber tow may include a top surface and a bottom surface. The top surface and the bottom surface are coupled via a generally rectangular shaped cross section of bundled carbon fiber filaments oriented in substantially congruent orientation. A binding agent may be coupled and/or applied to a surface of the tow. The binding agent may be separated by spaces of untreated portions of the carbon fiber tow along a span of the carbon fiber tow. Stated another way, the binder may not cover the entire surface of the tow. The untreated surfaces may be greater than the treated surface. The binder agent is configured to maintain the generally rectangular cross-sectional shape of the carbon fiber tow.

According to various embodiments, a pre-treatment of a portion of a carbon fiber tow/ribbon may include deploying a binding agent to a surface of the carbon fiber tow/ribbon. The binder agent may be configured to maintain a generally rectangular cross-sectional shape of the carbon fiber tow/ribbon when viewed along the Y axis of the carbon fiber tow/ribbon. The binding agent may be separated by spaces of untreated portions of the carbon fiber tow/ribbon along a span of the carbon fiber tow/ribbon. The span may be directed in the X axis.

BRIEF DESCRIPTION OF THE DRAWINGS

The present disclosure may be better understood with reference to the following drawing figures and description. Non-limiting and non-exhaustive descriptions are described with reference to the following drawing figures. The components in the figures are not necessarily to scale, emphasis instead being placed upon illustrating principles. In the figures, like referenced numerals may refer to like parts throughout the different figures unless otherwise specified. Further, because the disclosed fibers, tows and yarns (and their orientations) in practice are very small and closely packed, the figures herein may show exaggerated and/or idealized fiber width and spacing in order to more clearly illustrate the fiber orientations and shape of the bundles.

DETAILED DESCRIPTION

Figure 1:
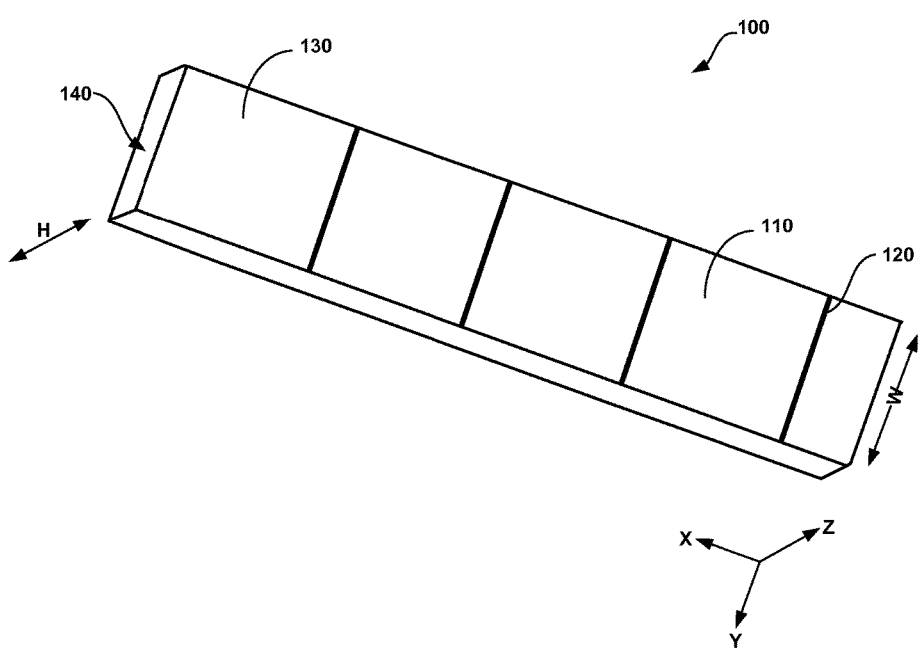
FIG. 1 illustrates a span of tow in accordance with various embodiments.

The detailed description of various embodiments herein makes reference to the accompanying drawing figures, which show various embodiments and implementations thereof by way of illustration and its best mode, and not of limitation. While these embodiments are described in sufficient detail to enable those skilled in the art to practice the embodiments, it should be understood that other embodiments may be realized and that logical and mechanical changes may be made without departing from the spirit and scope of the disclosure. Furthermore, any reference to singular includes plural embodiments, and any reference to more than one component or step may include a singular embodiment or step.

Also, any reference to attached, fixed, connected or the like may include permanent, removable, temporary, partial, full and/or any other possible attachment option. Additionally, any reference to without contact (or similar phrases) may also include reduced contact or minimal contact. Finally, though the various embodiments discussed herein may be carried out in the context of an aircraft, it should be understood that systems and methods disclosed herein may be incorporated into anything needing a brake or having a wheel, or into any vehicle such as, for example, an aircraft, a train, a bus, an automobile and the like.

C/C material is generally formed by utilizing continuous oxidized polyacrylonitrile (PAN) fibers, referred to as "OPF" fibers. Such OPF fibers are the precursors of carbonized PAN fibers and are used to fabricate a preformed shape using a needle punching process. OPF fibers are layered in a selected orientation into a preform of a selected geometry. Typically, two or more layers of fibers are layered onto a support and are then needled together simultaneously or in a series of needling steps. This process interconnects the horizontal fibers with a third direction (also called the z-direction). The fibers extending into the third direction are also called z-fibers. This needling process may involve driving a multitude of barbed needles into the fibrous layers to displace a portion of the horizontal fibers into the z-direction.

As used herein, the terms "tow" and "cable" are used to refer to one or more strands of substantially continuous filaments. Thus, a "tow" or "cable" may refer to a plurality of strands of substantially continuous filaments or a single strand of substantially continuous filament. "Spiral" fabric may also be referred to herein as "helical" fabric. A "textile" may be referred to as a "fabric" or a "tape." A "loom" may refer to any weaving device, such as a narrow fabric needle loom.

As used herein, the term "ribbon" is used to refer to a closely packed bundle of continuous filaments generally delivered from a spool. A "span" as used herein may be a length of ribbon and/or tow. As used herein, the term "yarn" is used to refer to a strand of substantially continuous fibers or staple fibers or blends of these; thus the term "yarn" encompasses tow and cable. As used herein, the unit "K" represents "thousand." Thus, a 1K tow means a tow comprising about 1,000 strands of substantially continuous filaments. For example, a "heavy tow" may comprise about 48,000 (48K) textile fibers in a single tow, whereas a "medium tow" may comprise about 24,000 (24K) textile fibers within a single tow whereas a "lighter tow" may comprise about 6,000 (6K) textile fibers within a single tow. Fewer or greater amounts of textile fibers may be used per cable in various embodiments. In various embodiments disclosed herein, fabrics in accordance with various embodiments may comprise tows of from about 0.1 k to about 100K, and, in various embodiments, heavier tows. As is understood, "warp" fibers are fibers that lie in the "warp" direction in the textile, i.e., along the length of the textile. "Weft" fibers are fibers that lie in the "weft" direction in the textile, i.e., along the width of the textile. Warp fibers may be described as being spaced apart with respect to the weft direction (i.e., spaced apart between the outer diameter (OD) and inner diameter (ID) of the textile). Similarly, the weft tows may be described as being spaced apart with respect to the warp direction.

In various embodiments, any combination of warp and weft tow size may be used. For example, 48 k warp tows may be used with 24 k weft tows. Also for example, other combinations of warp tows to weft tows include: 48K:12K, 24K:24K, and 24K:12K. A ribbon/carbon fiber tow may be wrapped around a round spool for ease of transport and feeding into a weaving apparatus for fabricating a fabric which is used in a subsequent preforming process using needle punching. The ribbon on the spool comprises a generally closed packed rectangular cross sectional shape. A length of ribbon may be delivered from the spool to the weaving apparatus. In response to being manipulated under tension by a weaving apparatus, the generally rectangular shaped cross section of the ribbon changes to a generally oval shaped cross section. This oval shaped cross section is undesirable and a preferred approach is to spread the ribbon in the Y direction to increase the width, W, of the ribbon to increase coverage and reduce fiber volume. The ribbon may be spread mechanically through passage over and under specially shaped bars. In the alternative, the ribbon may be spread via vacuum suction or through ultrasonic vibration.

Fabrication of dry fabrics where the carbon fiber tows retain their original flat ribbon shape (and rectangular cross-sectional shape) are further spread beyond their as manufactured width (but maintain a rectangular cross-sectional shape) is desirable for maximizing mechanical properties of fiber reinforced composites. The use of flat spread tows tends to minimize the amount of crimp in the manufactured fabrics and allows the fabrication of low areal weight fabric with full fiber coverage using larger tows such as about 12,000 to about 50,000 filament tows. Furthermore, in some applications, like the manufacturing of C/C friction disks where the dry fabric may be subsequently transformed into a 3D fiber structure, such as through a needle punching/needling process, looser spread tows are more conducive to the fabrication of a textile preform with a homogeneous fiber distribution within each horizontal plane of the textile.

As previously mentioned, commercial carbon fiber tows are typically packaged in the form of a flat ribbon onto cardboard spools. However, during handling under tension through the various components of a loom the dry tows have a tendency to neck down or reduce in cross sectional area and take a rounded or oval shape, when viewed along a cross section. Fiber coverage of these fabrics at low areal weights is very poor. A preform needled with such a fabric made of tighter rounded tows exhibits more distinct tows of higher fiber volume separated by larger gaps. These high fiber volume fiber bundles separated by larger gaps results in poor coverage and layers with locally higher density in finished composite product.

Some fabric suppliers to the composite industry have overcome this shortcoming by weaving prepreg tows. These pre-impregnated tows are not an option when the fabric is subsequently transformed using a needle punching process. For instance, prior technologies have used a resin prepreg step to set the width of the tow, thus fixing the tow geometry during weaving. This approach, where the fibers are fully encapsulated with a resin, is however not compatible with a post operation, such as needle punching. The barbed needles have difficulty manipulating the tow in the Z direction once the tow is hardened via the resin.

A technique allowing the tow to keep its original shape or to maintain an imparted desired shape, such as a wider shape with a rectangular cross-sectional profile, through the textile loom is disclosed herein. Contrary to commercial fabrics prepared with spread tows which are fully stabilized with a resin, the method disclosed herein is conducive to further dry processes, such as needle punching.

According to various embodiments and with reference to FIG. 1, a relatively soft binder, such as a polymeric adhesive, is applied to the carbon fiber tow to set and hold its width at a desired width prior to feeding the tow to a weaving machine and/or fabrication of the fabric and to allow for needle punching. FIG. 1 depicts a partial span of the carbon fiber tow 110 ribbon. This span may be a span that has been fed from the spool but prior to being manipulated by a loom and/or weaving apparatus. According to various embodiments, the soft binder may be applied to the ribbon of tow 110 prior to being wrapped around a spool such as the ribbon of tow 110 is produced. In general, span 100 comprises a rectangular cross section 140. A soft binder 120 may be imparted to a top surface 130 of the tow 110. The soft binder 120 may be an adhesive.

The adhesive is preferably a quick solidifying thermoplastic hot melt adhesive. This adhesive may be configured to allow fast on line application. Preferably, the adhesive may be configured to not be tacky to avoid being unintentionally deposited on the barbs of the needles or in the weaving apparatus during the needle punching operation. Hot melt adhesives may include wax products, polyolefins, and/or ethylene vinyl acetate (EVA). The adhesive may preferably be applied in form of very narrow band/line dispensed via a nozzle.

The soft binder 120 may be a propagation of fibers and adhesive. The fibers may comprise any desired material. The fibers may increase the structural stability of the soft binder 120. These fibers may be short lengths, such as each much shorter than the length of W. These fibers may comprise a powder like consistency and/or structure.

The soft binder 120 may be deposited at various, spaced apart locations on a surface 130 of the tow 110 and/or impregnated (to permeate) into the interior of the bundled carbon fiber filaments of the tow 110 in the Z direction such that the soft binder 120 spans at least a portion of the height H of tow 110. The soft binder 120 may be deposited on a top surface 130 of the tow 110 and/or a bottom surface of tow 110.

With continued reference to FIG. 1, the span of soft binder may be a series of portions of soft binder 120 that are spaced apart and span from one side of the tow 110 to the other side of the tow 110 along surface 130 generally in the Y direction. These portions of soft binder 120 may be separated/spaced apart in the X direction. For instance, a gap of from 1 inch (2.54 cm) to 4 inches (10.16 cm) of untreated, non-binder portion of the tow 110 may be between each portion of soft binder 120.

Figure 2:
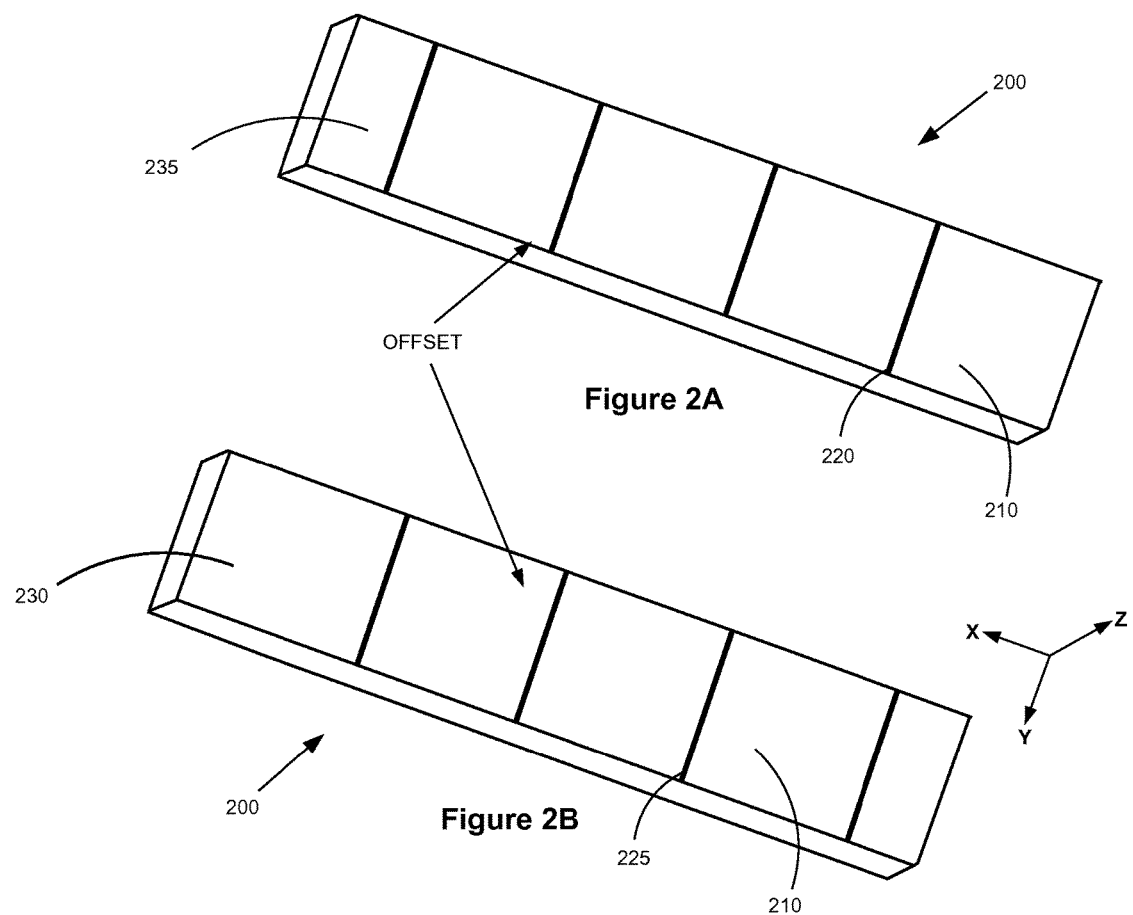
FIGS. 2A-2B illustrate a first side and a second side of a span of tow in accordance with various embodiments.

For instance and with reference to FIG. 2, a partial section of tow 200 is depicted. A top surface 235 of tow 210 is depicted by FIG. 2A. A line of soft binder 220 may be deposited substantially in the Y direction across the face of top surface 235. A bottom surface 230 of tow 210 is depicted in FIG. 2B. A line of soft binder 225 may be deposited substantially in the Y direction across the face of bottom surface 230. Though they may be deposited along the surface in any suitable location, the lines of soft binder 220 may be offset in the X direction from the lines of soft binder 225. This offset may increase the stability of the width of the tow throughout its span. According to various embodiments, the non-contiguous lines of soft binder 220 may be in-line and/or oriented in a common plane in the Z direction (not shown) on a top surface 235 of tow 210 and the non-contiguous lines of soft binder 225 may be in-line and/or oriented in a common plane in the Z direction (not shown) on a bottom surface 230.

Figure 3:
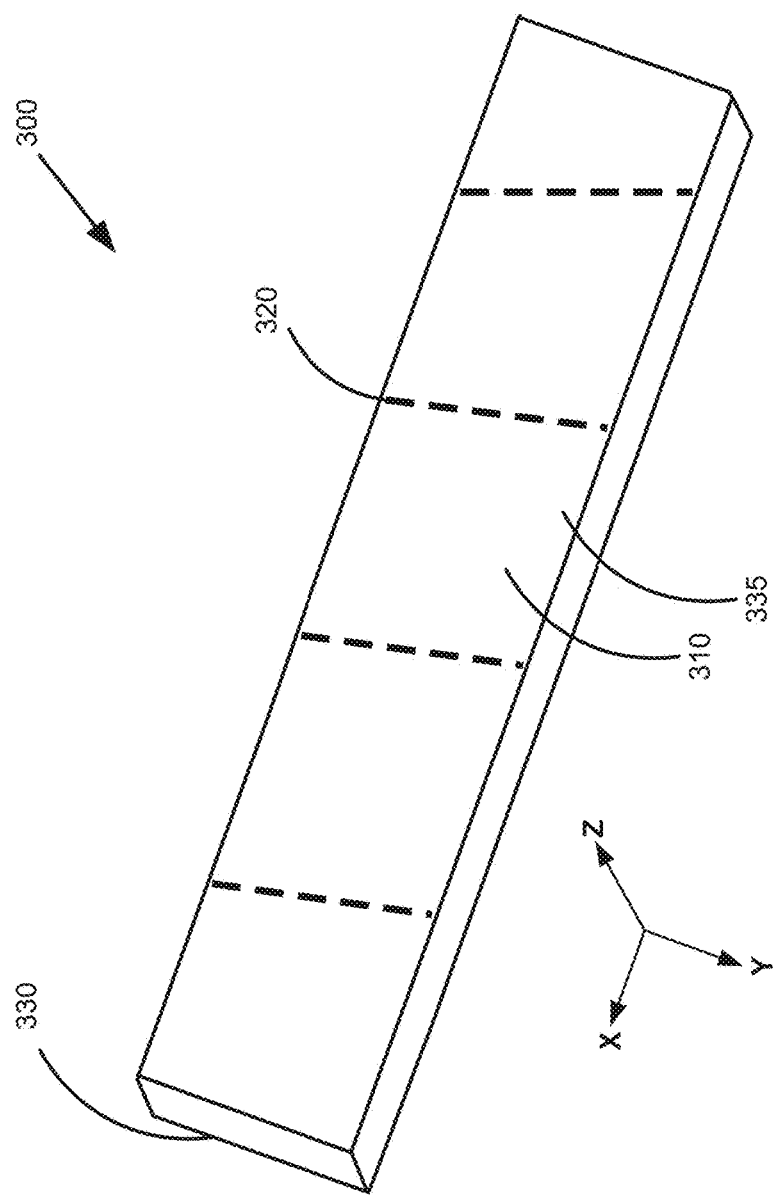
FIG. 3 illustrates a span of tow in accordance with various embodiments.

According to various embodiments and with reference to FIG. 3, a partial section 300 of tow 310 is depicted. Soft binder 320 may be deposited in any desired direction, on any surface of the tow 310, such as top surface 335 or bottom surface 330, continuously or discontinuously. Soft binder 320 may be deposited discontinuously in a dashed and/or dotted configuration. Thus, individual broken lines of soft binder 320 may span across the surface of tow 310 generally in the Y direction.

Figure 4:
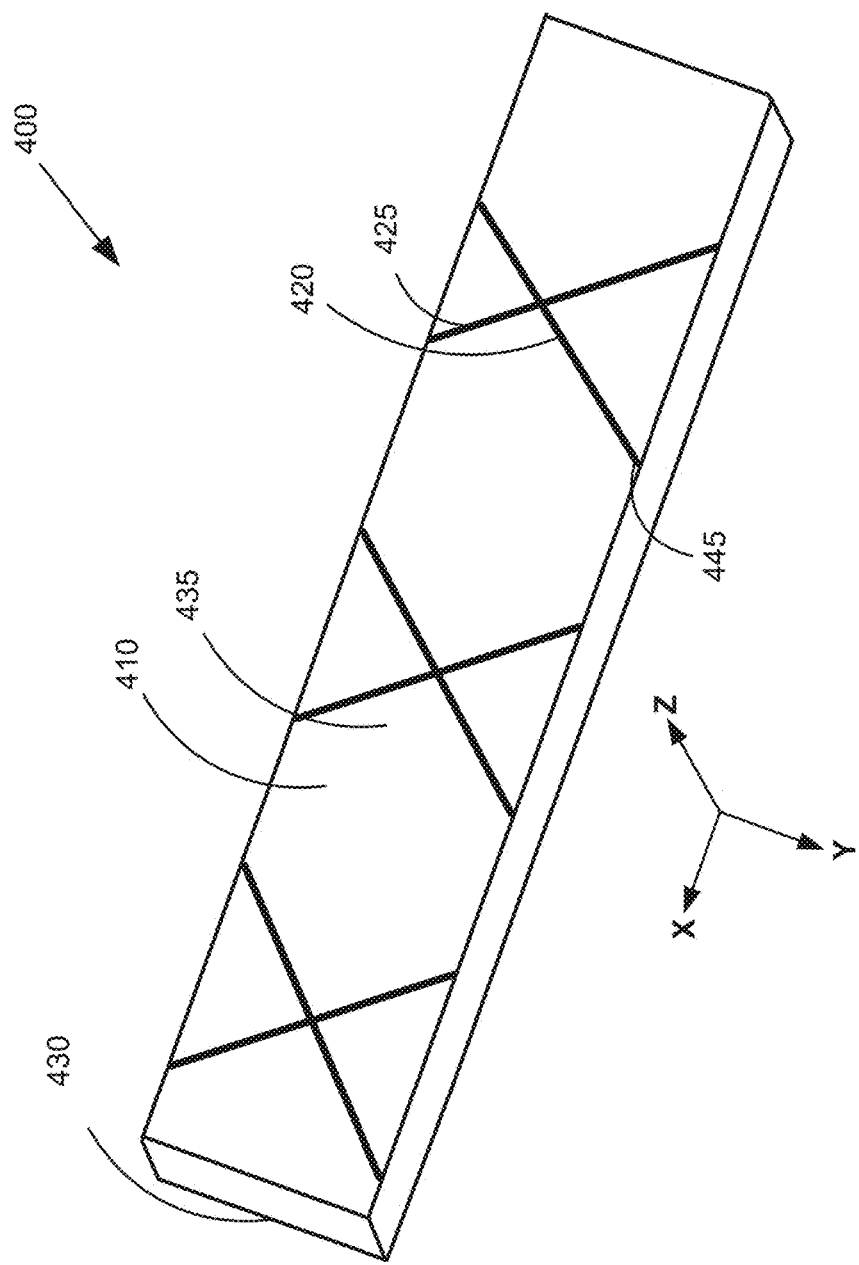
FIG. 4 illustrates a span of tow in accordance with various embodiments.

According to various embodiments and with reference to FIG. 4, a partial section 400 of tow 410 is depicted. Soft binder 420, 425 may be deposited in any desired direction on any surface of the tow 410, such as top surface 435 or bottom surface 430. For instance, two lines of soft binder may intersect, such as soft binder line 420 and soft binder line 425. Two lines of soft binder 420, 425 may generally form an "X" shape 445

Figure 5:
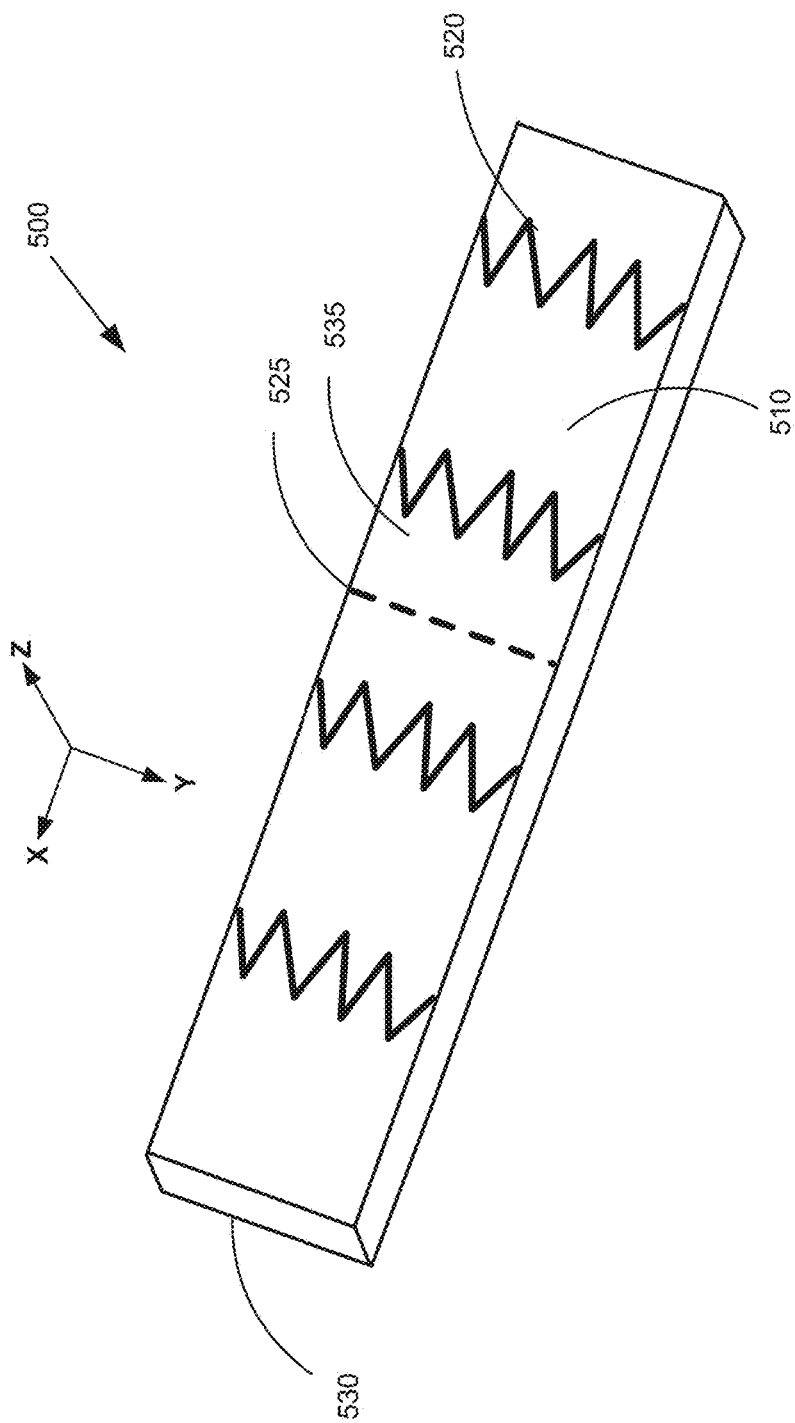
FIG. 5 illustrates a span of tow in accordance with various embodiments.

According to various embodiments and with reference to FIG. 5, a partial section 500 of tow 510 is depicted. Similar to previously described embodiments, soft binder 520, 525 may be deposited in any desired direction on any surface of the tow 510, such as top surface 535 or bottom surface 530. For instance, soft binder may be deposited in any desired pattern or configuration. For instance, as depicted in FIG. 5, a generally wavy pattern of soft binder 520 may be deposited across tow 510 generally in the Y direction. A random pattern, curved pattern, geometric, and/or freeform pattern of soft binder may be deposited along tow 510. Various embodiments of orientations described herein may be combined. For instance, the individual broken lines of soft binder 525 generally spanning across the surface of tow 510 generally in the Y direction may be utilized in addition to the wavy pattern of soft binder 520 generally spanning across the surface of tow 510 generally in the Y direction. Other combinations of soft binder orientations are contemplated.

Figure 6:
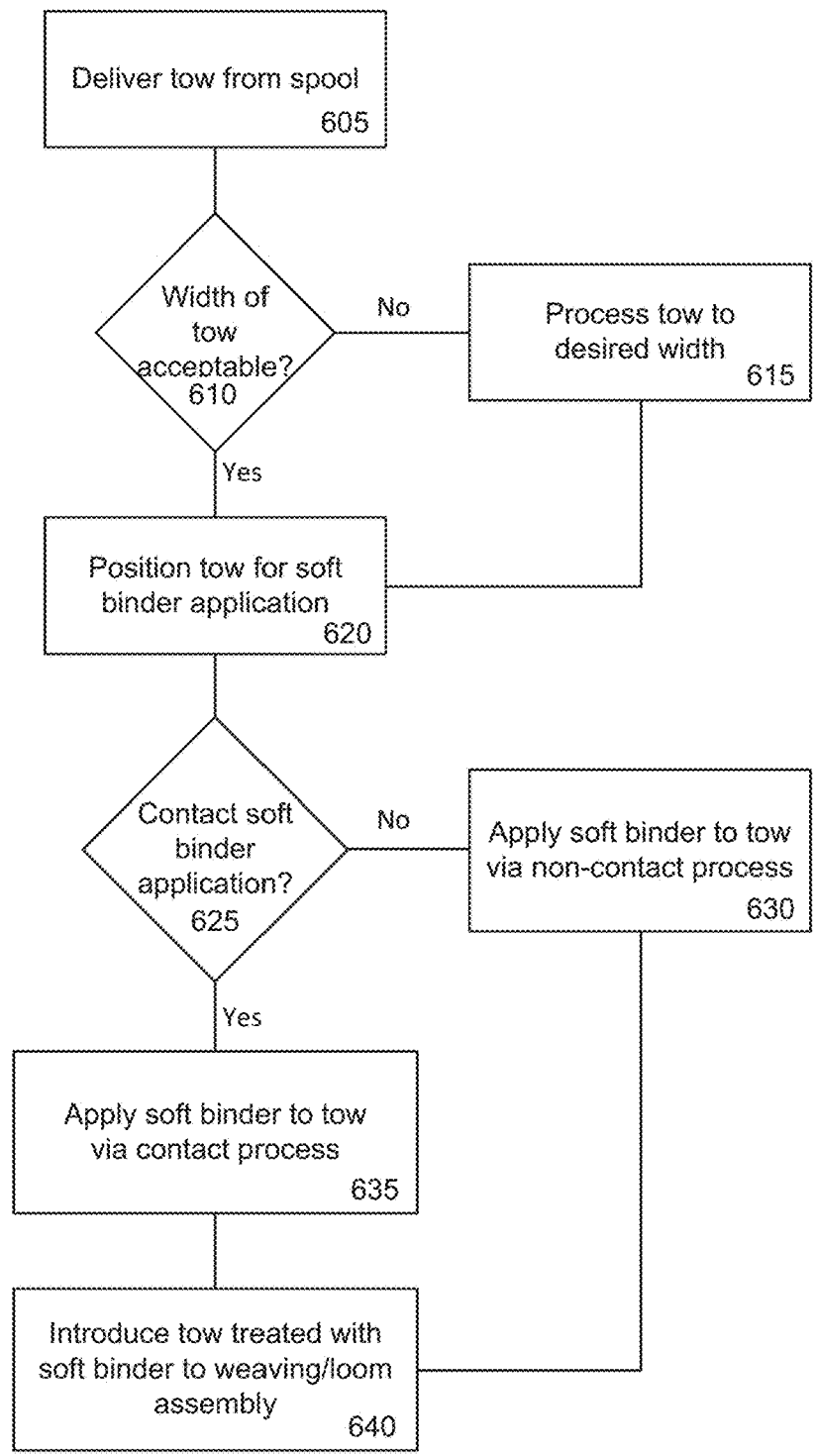
FIG. 6 illustrates a process for maintaining a desired cross-sectional shape of a tow for delivery to a weaving assembly in accordance with various embodiments.

FIG. 6 illustrates an exemplary process for maintaining a desired cross-sectional tow shape of the exemplary tows of FIGS. 1-5. Although applicable to all of the various tow embodiments, reference to the exemplary span of tow described in FIG. 1 is used solely to aid in the description of the exemplary process of FIG. 6. In the exemplary process described in FIG. 6, a ribbon of carbon fiber tow may be deployed from a spool of carbon fiber tow (step 605). A determination is made whether the width, W, of the tow from the manufacturer is acceptable (step 610). If the width, W, from the manufacturer is an acceptable width, the tow 110 may be prepped for application of a binding agent, such as a soft binder 120. If the width is not acceptable, such as the width is not a desired width, the carbon fiber tow may be processed, manipulated and/or spread such that the width is increased to a desired width (step 615). In response to the width, W, of the carbon fiber tow 110 being acceptable, the carbon fiber tow 110 may be positioned for application of the soft binder 120 (step 620). A contact application or a non-contact application process may be utilized to apply the soft binder 120 to the tow 110 (step 625, 630, 635). The tow 110 applied with soft binder 120 for preparing fabric which is subsequently introduced to a needling process (step 640). The soft binder 120 may be configured to maintain the generally rectangular cross-section of bundled carbon fiber filaments as the tow 110 is manipulated by the weaving assembly. The soft binder 120 may be configured to disintegrate when exposed to the high thermal conditions experienced when forming the carbon/carbon composite material.

Soft binder, such as soft binder 120, may be applied to the tow such as tow 110, through a fully automated non-contact process. For instance, one or more adhesive dispensing nozzle(s) may be in communication with a valve that meters a desired amount of soft binder to be deposited on/in the tow. This may be a hot melt application configured to be fully solidified prior to advancing the treated portion of tow into a weaving apparatus. Stated another way, the hot melt process is configured to cool very quickly as to not interfere with hardware in the weaving step.

According to various embodiments, a contact dispensing system, such as a slot coat applicator or any suitable applicator may be used to apply soft binder, such as in lines across the width, W, of the tow. As previously mentioned, soft binder, such as adhesive may be applied on one side or both sides of the tow by one or more application devices.

The various adhesive dispensing units may be installed in the proximity of each spool so as to fix the width of the tow as it is manufactured by the carbon fiber suppliers. Alternatively, known devices such as miniature "banana" shape bars may be inserted between the spools and the adhesive dispensing units to further spread the tow and fix the width of the tow in a spread configuration. The width, W, of the tow in the spread configuration is wider than the width of the tow on the spool.

Application of the hot melt adhesive may be conducted using a non-contact applicator, such as via a specialized electronically controlled hot melt spray nozzle. The spay pattern may be intermittent or continuous and take any shape, such as a narrow strips of adhesive running across the width, W, of the tow.

In response to the high temperature exposure experienced when the composite material is formed, the soft binder will be consumed and either be transformed into carbon or not leave perceptible any trace on the finished product.

As noted above, existing reels, spools and other mechanisms may be used for storing and deploying spiral wound textiles and/or carbon fiber tows. Although this disclosure illustrates and describes various embodiments, equivalents and modifications will occur to others who are skilled in the art upon reading and understanding of the disclosure. Various embodiments include all such equivalents and modifications, and are limited only by the scope of the following claims.

Additionally, benefits, other advantages, and solutions to problems have been described herein with regard to various embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, and C" or "at least one of A, B, or C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the singular forms "a," "an," and "the" include plural referents unless the context clearly dictates otherwise. As used herein, the terms "for example," "for instance," "such as," or "including" are meant to introduce examples that further clarify more general subject matter. Unless otherwise specified, these examples are embodiments of the present disclosure, and are not meant to be limiting in any fashion.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method of forming a composite material having a portion of a carbon fiber tow having a top surface and a bottom surface, comprising:
    deploying a hot-melt binding agent on the top surface and on the bottom surface of the carbon fiber tow at several locations along a span of the carbon fiber tow;
    solidifying the hot-melt binding agent prior to forming the composite material;
    feeding the carbon fiber tow into at least one of a weaving apparatus or a textile loom to form the composite material;
    exposing the binding agent to a thermal condition while forming the composite material;
    forming the composite material; and
    needle-punching the carbon fiber tow after forming the composite material;
    wherein the span is directed along an x-axis,
    wherein the binding agent is configured to maintain a generally rectangular cross-sectional shape of the carbon fiber tow when viewed along a y-axis of the carbon fiber tow,
    wherein the binding agent at at least one of the locations is spaced apart, along the span, from the binding agent at another of the locations and separated by an untreated portion of the carbon fiber tow,
    wherein the locations of the binding agent deployed on the top surface are offset from the locations of the binding agent deployed on the bottom surface,
    wherein the binding agent is configured to solidify after deployment, and
    wherein the binding agent is configured to at least one of disintegrate or be consumed in response to the thermal condition.

2. The method of forming the composite material of claim 1, wherein the binding agent spans from a first edge of the carbon fiber tow to an edge opposite the first edge along at least one of the top surface and the bottom surface of the carbon fiber tow.

3. The method of forming the composite material of claim 1, wherein the binding agent comprises at least one of a wax products, polyolefin chemistry, and ethylene vinyl acetate.

4. The method of forming the composite material of claim 1, further comprising manipulating a width of the carbon fiber tow prior to deploying the binding agent.

5. The method of forming the composite material of claim 1, wherein the binding agent is deployed via a contact applicator.

6. The method of forming the composite material of claim 1, wherein the binding agent comprises a binding agent selected for a non-deposit on barbs of needles during the needle-punching.

7. The method of forming the composite material of claim 1, wherein the binding agent is deployed in a discontinuous line spanning from a first edge of the carbon fiber tow to an edge opposite the first edge along at least one of the top surface or the bottom surface of the carbon fiber tow.

8. The method of forming the composite material of claim 1, wherein the binding agent is deployed in at least two lines traversing across at least one of the top surface or the bottom surface of the carbon fiber tow and that intersect at a discrete location to form an "X" shape.

9. The method of forming the composite material of claim 1, wherein the binding agent is deployed on at least one of the top surface or the bottom surface to permeate at least one of the top surface or the bottom surface of the carbon fiber tow.

* * * * *